United States Patent
Levin (10) Patent No.: US 10,179,540 B2
(45) Date of Patent: *Jan. 15, 2019

(54) SYSTEMS AND METHODS FOR PROVIDING HAPTIC EFFECTS

(71) Applicant: Immersion Corporation, San Jose, CA (US)

(72) Inventor: Michael D. Levin, Mountain View, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/295,478

(22) Filed: Oct. 17, 2016

(65) Prior Publication Data

US 2017/0088051 A1    Mar. 30, 2017

Related U.S. Application Data

(63) Continuation of application No. 10/923,202, filed on Aug. 20, 2004, now Pat. No. 9,495,009.

(51) Int. Cl.
  *G06F 3/01*    (2006.01)
  *B60Q 9/00*    (2006.01)
  *G06F 3/16*    (2006.01)

(52) U.S. Cl.
  CPC ............... *B60Q 9/00* (2013.01); *G06F 3/016* (2013.01); *G06F 3/165* (2013.01)

(58) Field of Classification Search
  CPC ............ G06F 3/165; G06F 3/016; B60Q 9/00
  See application file for complete search history.

(56) References Cited

U.S. PATENT DOCUMENTS

| 3,157,853 A | 11/1964 | Hirsch |
| 3,220,121 A | 11/1965 | Cutler |
| 3,497,668 A | 2/1970 | Hirsch |

(Continued)

FOREIGN PATENT DOCUMENTS

| DE | 44 00 790 A | 5/1995 |
| EP | 0111992 A2 | 6/1984 |

(Continued)

OTHER PUBLICATIONS

Japanese Patent Office, Notice for Reasons for Rejection, Application No. PH09-525241, dated Jan. 10, 2006.

(Continued)

*Primary Examiner* — Liliana Cerullo
(74) *Attorney, Agent, or Firm* — Kilpatrick Townsend & Stockton LLP (57) ABSTRACT

Systems and methods for providing haptic effects are disclosed. One disclosed system comprises an actuator, a non-volatile memory configured to store a haptic effect profile, and a processor in communication with the actuator and the non-volatile memory. The processor may be configured to receive a sensor signal indicating a movement of a manipulandum, to identify an effect parameter associated with the sensor signal in the haptic effect profile, and to generate an output signal based, at least in part, on the effect parameter. The generated output signal may be configured to cause the actuator to output a haptic effect associated with the effect parameter.

25 Claims, 4 Drawing Sheets

(56) References Cited

U.S. PATENT DOCUMENTS

| | | |
|---|---|---|
| 3,517,446 A | 6/1970 | Corlyon et al. |
| 3,795,150 A | 3/1974 | Eckhardt |
| 3,902,687 A | 9/1975 | Hightower |
| 3,903,614 A | 9/1975 | Diamond et al. |
| 3,919,691 A | 11/1975 | Noll |
| 4,160,508 A | 7/1979 | Salsbury, Jr. |
| 4,236,325 A | 12/1980 | Hall et al. |
| 4,262,240 A | 4/1981 | Arai |
| 4,400,790 A | 8/1983 | Chambers et al. |
| 4,477,043 A | 10/1984 | Repperger |
| 4,513,235 A | 4/1985 | Acklam et al. |
| 4,553,080 A | 11/1985 | Cannon et al. |
| 4,560,983 A | 12/1985 | Williams |
| 4,581,491 A | 4/1986 | Boothroyd |
| 4,599,070 A | 7/1986 | Hladky et al. |
| 4,652,805 A | 3/1987 | Kohn |
| 4,706,294 A | 11/1987 | Ouchida |
| 4,708,656 A | 11/1987 | De Vries et al. |
| 4,713,007 A | 12/1987 | Alban |
| 4,758,165 A | 7/1988 | Tieman et al. |
| 4,768,412 A | 9/1988 | Sanderson |
| 4,823,106 A | 4/1989 | Lovell |
| 4,859,922 A | 8/1989 | Tauchenitz et al. |
| 4,868,549 A | 9/1989 | Affinito et al. |
| 4,891,764 A | 1/1990 | McIntosh |
| 4,930,770 A | 6/1990 | Baker |
| 4,934,694 A | 6/1990 | McIntosh |
| 4,947,097 A | 8/1990 | Tao |
| 4,964,004 A | 10/1990 | Barker |
| 4,979,050 A | 12/1990 | Westland et al. |
| 5,019,761 A | 5/1991 | Kraft |
| 5,022,407 A | 6/1991 | Horch et al. |
| 5,035,242 A | 7/1991 | Franklin |
| 5,038,089 A | 8/1991 | Szakaly |
| 5,078,152 A | 1/1992 | Bond |
| 5,086,296 A | 2/1992 | Clark |
| 5,095,303 A | 3/1992 | Clark et al. |
| 5,103,404 A | 4/1992 | McIntosh |
| 5,116,051 A | 5/1992 | Moncrief et al. |
| 5,116,180 A | 5/1992 | Fung et al. |
| 5,185,561 A | 2/1993 | Good et al. |
| 5,186,695 A | 2/1993 | Mangseth et al. |
| 5,187,630 A | 2/1993 | MacKay et al. |
| 5,189,355 A | 2/1993 | Larkins et al. |
| 5,191,320 A | 3/1993 | MacKay |
| 5,212,473 A | 5/1993 | Louis |
| 5,220,260 A | 6/1993 | Schuler |
| 5,240,417 A | 8/1993 | Smithson et al. |
| 5,270,689 A | 12/1993 | Hermann |
| 5,271,290 A | 12/1993 | Fischer |
| 5,275,174 A | 1/1994 | Cook |
| 5,299,810 A | 4/1994 | Pierce |
| 5,309,140 A | 5/1994 | Everett |
| 5,334,027 A | 8/1994 | Wherlock |
| 5,368,484 A | 11/1994 | Copperman et al. |
| 5,381,080 A | 1/1995 | Schnell et al. |
| 5,382,373 A | 1/1995 | Carlson et al. |
| 5,396,266 A | 3/1995 | Birmhall |
| 5,466,213 A | 11/1995 | Hogan |
| 5,492,312 A | 2/1996 | Carlson |
| 5,542,672 A | 8/1996 | Meredith |
| 5,543,821 A | 8/1996 | Marchis et al. |
| 5,547,382 A | 8/1996 | Yamasaki |
| 5,559,432 A | 9/1996 | Logue |
| 5,577,581 A | 11/1996 | Eberwein et al. |
| 5,578,238 A | 11/1996 | Weiss et al. |
| 5,580,249 A | 12/1996 | Jacobsen et al. |
| 5,591,082 A | 1/1997 | Jensen et al. |
| 5,665,946 A | 9/1997 | Nishijima et al. |
| 5,683,615 A | 11/1997 | Munoz |
| 5,705,085 A | 1/1998 | Munoz et al. |
| 5,711,746 A | 1/1998 | Carlson |
| 5,714,978 A | 2/1998 | Yamanaka et al. |
| 5,721,566 A | 2/1998 | Rosenberg et al. |
| 5,730,655 A | 3/1998 | Meredith |
| 5,766,016 A | 6/1998 | Sinclair |
| 5,767,836 A | 6/1998 | Scheffer et al. |
| 5,767,839 A | 6/1998 | Rosenberg |
| 5,781,172 A | 7/1998 | Engel et al. |
| 5,785,630 A | 7/1998 | Bobick et al. |
| 5,816,105 A | 10/1998 | Adelstein |
| 5,816,823 A | 10/1998 | Nalmark et al. |
| 5,889,670 A | 3/1999 | Schuler et al. |
| 5,914,705 A | 6/1999 | Johnson et al. |
| 5,944,151 A | 8/1999 | Jakobs et al. |
| 6,002,184 A | 12/1999 | Delson et al. |
| 6,008,800 A | 12/1999 | Pryor |
| 6,087,829 A | 7/2000 | Jager |
| 6,100,476 A | 8/2000 | Adamietz et al. |
| 6,111,577 A | 8/2000 | Ziles et al. |
| 6,128,006 A | 10/2000 | Rosenberg et al. |
| 6,147,422 A | 11/2000 | Delson et al. |
| 6,154,201 A | 11/2000 | Levin et al. |
| 6,195,592 B1 | 2/2001 | Schuler et al. |
| 6,211,861 B1 | 4/2001 | Rosenberg et al. |
| 6,215,470 B1 | 4/2001 | Rosenberg et al. |
| 6,219,034 B1 | 4/2001 | Elbing et al. |
| 6,243,078 B1 | 6/2001 | Rosenberg |
| 6,262,717 B1 | 7/2001 | Donohue et al. |
| 6,271,828 B1 | 8/2001 | Rosenberg et al. |
| 6,271,833 B1 | 8/2001 | Rosenberg et al. |
| 6,271,834 B1 | 8/2001 | May et al. |
| 6,283,859 B1 | 9/2001 | Carlson et al. |
| 6,307,285 B1 | 10/2001 | Delson et al. |
| 6,337,678 B1 | 1/2002 | Fish |
| 6,348,772 B1 | 2/2002 | May |
| 6,375,465 B1 | 4/2002 | Jolly et al. |
| 6,394,239 B1 | 5/2002 | Carlson |
| 6,400,352 B1 | 6/2002 | Bruneau et al. |
| 6,420,806 B2 | 7/2002 | Witting |
| 6,422,941 B1 | 7/2002 | Thorner et al. |
| 6,468,158 B1 | 10/2002 | Ootori et al. |
| 6,480,752 B1 | 11/2002 | Blume et al. |
| 6,486,872 B2 | 11/2002 | Rosenberg et al. |
| 6,589,117 B1 | 7/2003 | Moritome et al. |
| 6,591,175 B2 | 7/2003 | Numata et al. |
| RE38,242 E | 9/2003 | Engel et al. |
| 6,613,997 B2 | 9/2003 | Oster et al. |
| 6,636,202 B2 | 10/2003 | Ishmael, Jr. et al. |
| 6,637,311 B2 | 10/2003 | Barden |
| 6,640,940 B2 | 11/2003 | Carlson |
| 6,645,632 B2 | 11/2003 | Wegmuller et al. |
| 7,812,820 B2 | 10/2010 | Schuler et al. |
| 9,495,009 B2 * | 11/2016 | Levin ..................... G06F 3/016 |
| 2001/0048030 A1 | 12/2001 | Sharood et al. |
| 2001/0052893 A1 | 12/2001 | Jolly et al. |
| 2002/0033795 A1 | 3/2002 | Shahoian et al. |
| 2002/0044132 A1 | 4/2002 | Fish |
| 2002/0067336 A1 | 6/2002 | Wegmuller et al. |
| 2002/0084983 A1 | 7/2002 | Boldy |
| 2002/0158842 A1 | 10/2002 | Guy et al. |
| 2003/0006958 A1 | 1/2003 | Onodera |
| 2003/0038774 A1 | 2/2003 | Piot et al. |
| 2003/0079948 A1 | 5/2003 | Jolly et al. |
| 2003/0080939 A1 | 5/2003 | Kobayashi |
| 2003/0184518 A1 | 10/2003 | Numata et al. |
| 2004/0040800 A1 | 3/2004 | Anastas et al. |
| 2004/0119683 A1 * | 6/2004 | Warn ..................... B60K 37/06 345/156 |
| 2004/0169483 A1 | 9/2004 | Hardwick |
| 2005/0012710 A1 | 1/2005 | Hayward |
| 2005/0017454 A1 | 1/2005 | Endo et al. |

FOREIGN PATENT DOCUMENTS

| | | |
|---|---|---|
| EP | 0349086 | 1/1990 |
| EP | 0640902 A2 | 3/1995 |
| JP | 61-240317 | 10/1986 |
| JP | 63-293624 | 11/1988 |
| JP | 01-003664 | 7/1990 |
| JP | 02-109714 | 1/1992 |
| JP | 04-291414 | 10/1992 |
| JP | 04-007371 | 8/1993 |

(56) References Cited

FOREIGN PATENT DOCUMENTS

| JP | 05-193862 | 1/1995 |
|----|-----------|--------|
| JP | 07-013693 | 1/1995 |
| JP | 07-182104 | 7/1995 |

OTHER PUBLICATIONS

Japanese Patent Office, Notice for Reasons for Rejection, Application No. P2007-196505, dated Feb. 9, 2010.
Japanese Patent Office, Notice for Reasons of Rejection, Application No. P2009-293127, dated Jun. 1, 2010.
U.S. Patent Office, Office Action, U.S. Appl. No. 10/072,728, dated Apr. 3, 2008.
U.S. Patent Office, Office Action, U.S. Appl. No. 10/072,728, dated Apr. 7, 2004.
U.S. Patent Office, Office Action, U.S. Appl. No. 09/253,392, dated May 11, 2001.
U.S. Patent Office, Office Action, U.S. Appl. No. 10/072,728, dated May 17, 2007.
U.S. Patent Office, Office Action, U.S. Appl. No. 10/072,728, dated Jun. 24, 2009.
U.S. Patent Office, Office Action, U.S. Appl. No. 10/072,728, dated Oct. 20, 2009.
U.S. Patent Office, Office Action, U.S. Appl. No. 10/072,728, dated Nov. 2, 2007.
U.S. Patent Office, Office Action, U.S. Appl. No. 10/072,728, dated Nov. 15, 2005.
U.S. Patent Office, Office Action, U.S. Appl. No. 10/072,728, dated Dec. 11, 2008.
U.S. Patent Office, Office Action, U.S. Appl. No. 10/072,728, dated Dec. 13, 2004.
U. S. Patent Office U.S. Appl. No. 10/923,202, Final Office Action dated Feb. 11, 2016.
U. S. Patent Office U.S. Appl. No. 10/923,202, Non-Final Office Action dated Jul. 1, 2015.
U. S. Patent Office U.S. Appl. No. 10/923,202, Final Office Action dated Sep. 8, 2011.
U. S. Patent Office U.S. Appl. No. 10/923,202, Non-Final Office Action dated Mar. 2, 2011.
U. S. Patent Office U.S. Appl. No. 10/923,202, Non-Final Office Action dated Aug. 25, 2010.
U. S. Patent Office U.S. Appl. No. 10/923,202, Final Office Action dated Dec. 18, 2009.
U. S. Patent Office U.S. Appl. No. 10/923,202, Non-Final Office Action dated May 6, 2009.
U. S. Patent Office U.S. Appl. No. 10/923,202, Final Office Action dated Oct. 16, 2008.
U. S. Patent Office U.S. Appl. No. 10/923,202, Non-Final Office Action dated Apr. 7, 2008.
European Patent Office, European Search Report, Application No. 96945421, dated Nov. 20, 2001.
Adelstein , "A Virtual Environment System for the Study of Human Arm Tremor", Ph.D. Dissertation, Department of Mechanical Engineering, MIT, Jun. 1989.
Adelstein , "Design and Implementation of a Force Reflecting Manipulandum for Manual Control Research", Advances in Robotics, DSC vol. 42, Edited by H. Kazerooni, 1992, pp. 1-12.
Aukstakalnis et al., "Silicon Mirage: The Art and Science of Virtual Reality," ISBN 0-938151-82-7, pp. 129-180, 1992.
Badescu, "Rotary Haptic Knob for Vehicular Instrument Controls," Proceedings of the 10th Symp. on Haptic Interfaces for Virtual Envir. & Teleoperator Systs. (HAPTICS'02), 2002.
Baigrie, "Electric Control Loading—A Low Cost, High Performance Alternative," Proceedings, pp. 247-254, Nov. 6-8, 1990.
Bejczy et al., "A Laboratory Breadboard System for Dual-Arm Teleoperation," SOAR '89 Workshop, JSC, Houston, TX, Jul. 25-27, 1989.

Bejczy et al., "Kinesthetic Coupling Between Operator and Remote Manipulator," International Computer Technology Conference, The American Society of Mechanical Engineers, San Francisco, CA, Aug. 12-15, 1980.
Bejczy, "Generalization of Bilateral Force-Reflecting Control of Manipulators," Proceedings of Fourth CISM-IFToMM, Sep. 8-12, 1981.
Bejczy, "Sensors, Controls, and Man-Machine Interface for Advanced Teleoperation," Science, vol. 208, No. 4450, pp. 1327-1335, 1980.
Bejczy, et al., "Universal Computer Control System (UCCS) for Space Telerobots," CH2413-3/87/0000/0318501.00 1987 IEEE, 1987.
Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.
Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.
Caldwell et al., "Enhanced Tactile Feedback (Tele-Taction) Using a Multi-Functional Sensory System," 1050-4729/93, pp. 955-960, 1993.
Colgate, J. Edward, et al., "Implementation of Stiff Virtual Walls in Force-Reflecting Interfaces," Department of Mechanical Engineering, Northwestern University, Evanston, IL, Sep. 1993.
"Cyberman Technical Specification," Logitech Cyberman SWIFT Supplement, Apr. 5, 1994.
Eberhardt et al., "Including Dynamic Haptic Perception by The Hand: System Description and Some Results," DSC-vol. 55-1, Dynamic Systems and Control: vol. 1, ASME 1994.
Eberhardt et al., "OMAR—A Haptic display for speech perception by deaf and deaf-blind individuals," IEEE Virtual Reality Annual International Symposium, Seattle, WA, Sep. 18-22, 1993.
Gobel et al., "Tactile Feedback Applied to Computer Mice," International Journal of Human-Computer Interaction, vol. 7, No. 1, pp. 1-24, 1995.
Howe, "A Force-Reflecting Teleoperated Hand System for the Study of Tactile Sensing in Precision Manipulation," Proceedings of the 1992 IEEE International Conference on Robotics and Automation, Nice, France, May 1992.
IBM Technical Disclosure Bulletin, "Mouse Ball-Actuating Device With Force and Tactile Feedback," vol. 32, No. 9B, Feb. 1990.
Iwata, "Pen-based Haptic Virtual Environment," 0-7803-1363-1/93 IEEE, pp. 287-292, 1993.
Jacobsen et al., "High Performance, Dextrous Telerobotic Manipulator With Force Reflection," Intervention/ROV '91 Conference & Exposition, Hollywood, Florida, May 21-23, 1991.
Jones et al., "A perceptual analysis of stiffness," ISSN 0014-4819 Springer International (Springer-Verlag); Experimental Brain Research, vol. 79, No. 1, pp. 150-156, 1990.
Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.
Marcus, "Touch Feedback in Surgery," Proceedings of Virtual Reality and Medicine The Cutting Edge, Sep. 8-11, 1994.
McAffee, "Teleoperator Subsystem/Telerobot Demonstrator: Force Reflecting Hand Controller Equipment Manual," JPL D-5172, pp. 1-50, A1-A36, B1-B5, C1-C36, Jan. 1988.
Minsky, "Computational Haptics: The Sandpaper System for Synthesizing Texture for a Force-Feedback Display," Ph.D. Dissertation, MIT, Jun. 1995.
Ouhyoung et al., "The Development of A Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.
Ouh-Young, "Force Display in Molecular Docking," Order No. 9034744, p. 1-369, 1990.
Ouh-Young, "A Low-Cost Force Feedback Joystick and Its Use in PC Video Games," IEEE Transactions on Consumer Electronics, vol. 41, No. 3, Aug. 1995.
Patrick et al., "Design and Testing of a Non-reactive, Fingertip, Tactile Display for Interaction with Remote Environments," Coop- (56) References Cited

OTHER PUBLICATIONS erative Intelligent Robotics in Space, Rui J. deFigueiredo et al., Editor, Proc. SPIE vol. 1387, pp. 215-222, 1990.

Pimentel et al., "Virtual Reality: through the new looking glass," $2^{nd}$ Edition; McGraw-Hill, ISBN 0-07-050167-X, pp. 41-202, 1994.

Rabinowitz et al., "Multidimensional tactile displays: Identification of vibratory intensity, frequency, and contactor area," Journal of the Acoustical Society of America, vol. 82, No. 4, Oct. 1987.

Russo, "Controlling Dissipative Magnetic Particle Brakes in Force Reflective Devices," DSC-vol. 42, Advances in Robotics, pp. 63-70, ASME 1992.

Russo, "The Design and Implementation of a Three Degree of Freedom Force Output Joystick," MIT Libraries Archives Aug. 14, 1990, pp. 1-131, May 1990.

Scannell, "Taking a Joystick Ride," Computer Currents, Boston Edition, vol. 9, No. 11, Nov. 1994.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

Snow et al., "Model-X Force-Reflecting-Hand-Controller," NT Control No. MPO-17851; JPL Case No. 5348, pp. 1-4, Jun. 15, 1989.

Stanley et al., "Computer Simulation of Interacting Dynamic Mechanical Systems Using Distributed Memory Parallel Processors," DSC-vol. 42, Advances in Robotics, pp. 55-61, ASME 1992.

Tadros, "Control System Design for a Three Degree of Freedom Virtual Environment Simulator Using Motor/Brake Pair Actuators", MIT Archive © Massachusetts Institute of Technology, pp. 1-88, Feb. 1990.

Terry et al., "Tactile Feedback in a Computer Mouse," Proceedings of Fourteenth Annual Northeast Bioengineering Conference, University of New Hampshire, Mar. 10-11, 1988.

Gotow et al., "Controlled Impedance Test Apparatus for Studying Human Interpretation of Kinesthetic Feedback," Proceedings of the 1989 American Control Conference, Pittsburgh, PA, Jun. 21-23, 1989, pp. 332-337.

Kaczmarek et al., W. Barfield and T. A. Furness, "Tactile Displays," Virtual Environments and Advanced Interface Design, Oxford, New York, 1995, pp. 349-414.

\* cited by examiner

SYSTEMS AND METHODS FOR PROVIDING HAPTIC EFFECTS

This application is a continuation of U.S. patent application Ser. No. 10/923,202, filed Aug. 20, 2004, titled "Systems and Methods for Providing Haptic Effects," the entirety of which is hereby incorporated by reference.

FIELD OF THE INVENTION

The present invention generally relates to providing haptic feedback. The present invention more particularly relates to systems and methods for providing haptic effects.

BACKGROUND

Electronic-device manufacturers strive to produce a rich interface for users. Conventional devices utilize visual and auditory cues to provide feedback to a user. In some interface devices, kinesthetic feedback (such as active and resistive force feedback), and/or tactile feedback (such as vibration, texture, and heat), is also provided to the user, more generally known collectively as "haptic feedback." Haptic feedback provides additional cues that enhance and simplify the user interface.

Some conventional mechanical control devices may be function-specific, for example, configured to implement a single haptic effect. Although able to provide haptic feedback to a user, function-specific mechanical control devices may require unique designs, components, and manufacturing processes to produce. Some conventional electronic haptic feedback devices may be capable of implementing a variety of haptic effects, but may require a host processor to store haptic effect profiles and parameters for implementing them.

Thus a need exists for effective systems and methods for providing haptic effects without a host processor.

SUMMARY

Embodiments of the present invention comprise systems and methods for providing haptic effects. One device embodying the present invention comprises an actuator, a non-volatile memory configured to store a haptic effect profile, and a processor in communication with the actuator and the non-volatile memory. The processor may be configured to receive a sensor signal indicating a movement of a manipulandum. The processor may be further configured to identify an effect parameter associated with the sensor signal in the haptic effect profile stored in the non-volatile memory, and to generate an output signal based, at least in part, on the effect parameter. The output signal may be configured to cause the actuator to output a haptic effect associated with the effect parameter.

This embodiment is mentioned not to limit or define the invention, but to provide an example of an embodiment of the invention to aid understanding thereof. Illustrative embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments of the present invention comprise methods and systems for providing haptic effects. A variety of haptic effect profiles and effect parameters may be utilized in order to provide a multitude of haptic effects to the user of a device employing an embodiment of this invention. Embodiments of the present invention may be utilized by a broad array of devices and systems, including cell phones, personal digital assistants, cameras, camcorders, MP3 players, home or automobile HVAC control-panels, navigation devices, audio reproduction devices, and other electronic and mechanical devices and systems.

An electronic pre-programmed haptic feedback device may incorporate a variety of technologies for providing haptic feedback, including both active and resistive technologies. Active haptic feedback devices, including, for example, devices incorporating motors, add energy to a system; resistive devices, such as devices incorporating brakes, remove energy from the system. Some active haptic feedback devices may incorporate a resistive element, such as a brake. Also, an active haptic feedback device (such as a motor) may be used as a resistive device (e.g. a generator).

Active haptic actuators may utilize, for example, alternating current (AC) or direct current (DC) electric motors and/or generators. Resistive haptic actuators may utilize, for example, electromagnetic brakes, magnetic particle brakes, magnetorheologic or electrorheologic brakes, or magnetic (non-friction) brakes. Electromagnetic brakes utilize a magnetic core, a coil, and a magnetic target. When a current is applied to the coil, the magnetic core acts upon the magnetic target. Magnetic particle brakes utilize a powder comprising particles of a magnetic material. When a current is applied, the particles line up and cause the powder to expand. Rheologic fluid brakes utilize a fluid that changes viscosity when a current is applied. A magnetic brake generates a magnetic field, and when a piece of metal passes through the magnetic field, an anti-current is generated, causing a resistance to movement of the metal.

Figure 1:
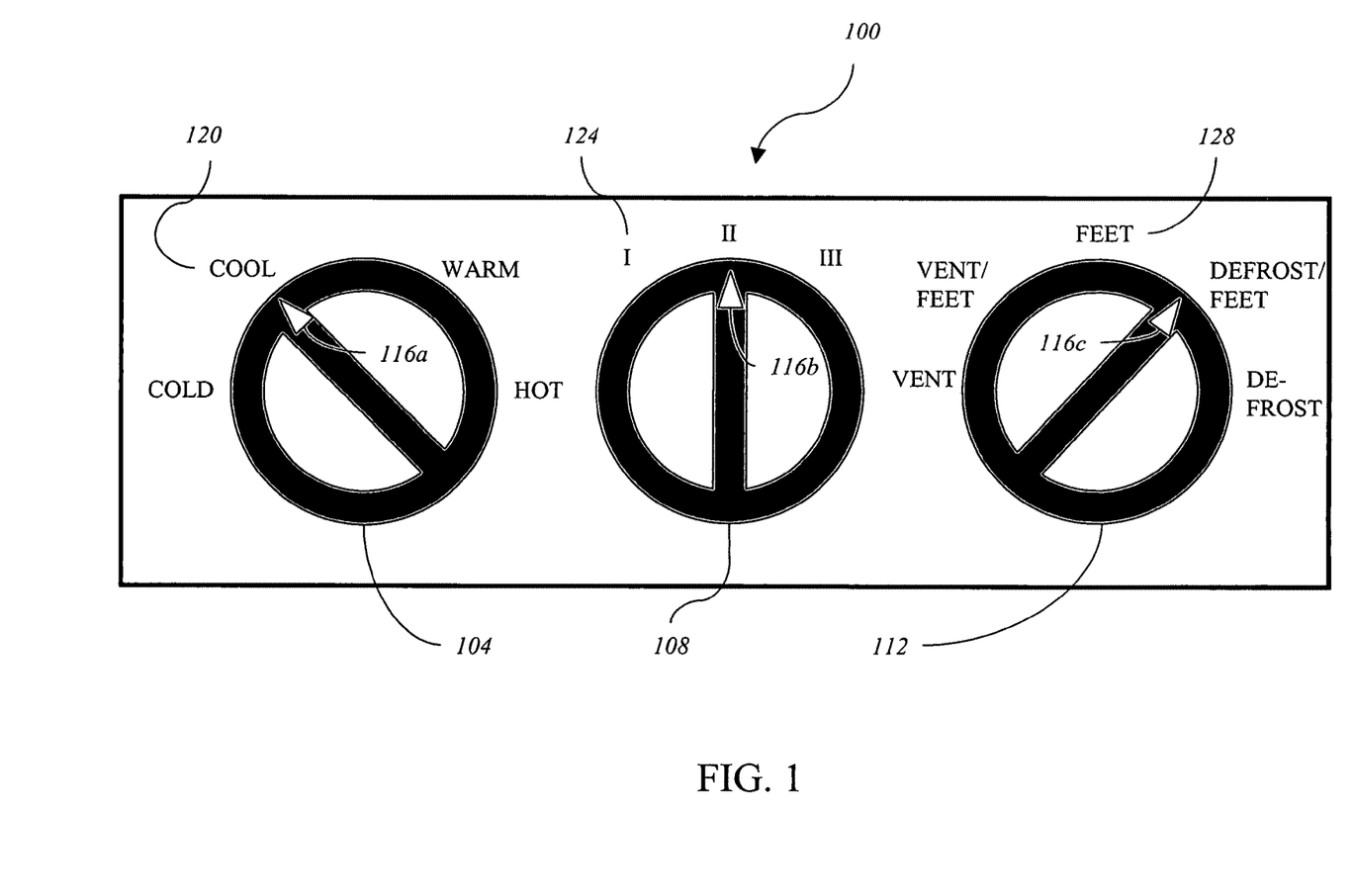
FIG. 1 illustrates a heating, ventilating, and air-conditioning control-panel incorporating one embodiment of the present invention.

Referring now to the drawings in which like numerals indicate like elements throughout the several figures, FIG. 1 illustrates a heating, ventilating, and air-conditioning (HVAC) control-panel 100 incorporating one embodiment of the present invention. The HVAC control-panel 100 shown in FIG. 1 comprises a configuration similar to that found in passenger automobiles and light trucks. The HVAC control-panel 100 shown comprises several manipulanda, interface elements that a user of the HVAC control-panel 100 can manipulate. In other embodiments, a single manipulandum may be used. The manipulanda shown in FIG. 1 comprise substantially-round control knobs. In other embodiments, other or additional manipulanda, such as sliders, switches, scroll wheels, trackballs, and joysticks may be used.

Each control knob shown in FIG. 1 is responsible for a different function. For instance, a temperature control knob 104 shown may be used by a user to control a temperature of air forced into a cabin of an automobile; a fan speed control knob 108 shown may be used to control the speed of a fan responsible for forcing warmed or cooled air into the cabin; and a location control knob 112 shown may be used to control the output location(s) for the forced air. The embodiment shown in FIG. 1 provides haptic feedback to the control knobs 104, 108, 112 to enhance the user's interaction with the HVAC control-panel 100. While knobs of differing physical structure may be used, the control knobs 104, 108, 112 shown comprise a substantially similar physical structure, but provide different haptic effects to a user of the HVAC control-panel 100.

A device according to the present invention may provide haptic feedback in various physical mechanisms, such as the control knobs 104, 108, 112 shown in FIG. 1. For example, the temperature control knob 104 shown in FIG. 1 may be set anywhere between a series of four temperature settings 120 located around the circumference of the temperature control knob 104 by pointing the indicator 116a toward the desired setting. For instance, in the embodiment shown, the indicator 116a of the temperature control knob 104 has been set substantially near the "COOL" temperature setting 120. A user of the HVAC control-panel 100 may select a different forced air temperature setting by adjusting the temperature control knob 104 to a different temperature setting 120. For example, to increase the temperature of the forced air, the user may turn the temperature control knob 104 clockwise to a setting nearer the "WARM" or "HOT" temperature settings 120.

The fan speed control knob 108 shown in FIG. 1 may be set on any one of three fan speed settings 124 located around the circumference of the fan speed control knob 108 by pointing the indicator 116b toward the desired setting. For instance, in the embodiment shown, the indicator 116b of the fan speed control knob 108 has been set to the intermediate fan speed setting 124, labeled "II" for identification. A user of the HVAC control-panel 100 may select a lower or higher fan speed by turning the fan speed control knob 108 to fan speed settings 124 "I" or "III," respectively.

The location control knob 112 shown in FIG. 1 may be set on any one of five location settings 128 located around the circumference of the location control knob 112 by pointing the indicator 116c toward the desired setting. For instance, in the embodiment shown, the indicator 116c of the location control knob 112 has been set to the location setting 128 labeled "DEFROST/FEET." Each location setting 128 of the location control knob 112 is associated with a different combination of open and closed baffles located behind a dashboard of the automobile comprising the HVAC control-panel 100. Each associated combination of open and closed baffles permits forced warmed or cooled air to escape into the cabin at varying locations.

For example, the "DEFROST/FEET" location setting 128 permits the "COOL" air forced at the intermediate "II" speed to escape into the cabin of the vehicle at the driver's feet and at a defrosting vent located substantially near the base of the windshield of the automobile comprising the HVAC control-panel 100. The user may select a different location setting 128 by turning the indicator 116c of the location control knob 112 to a different setting; for instance, the user may select the "VENT" location setting 128 to permit the air to be forced through vents located in the dashboard of the automobile containing the HVAC control-panel 100.

The three control knobs 104, 108, 112 shown in FIG. 1 each comprise substantially similar physical components and structure, but may each be configured to provide a different haptic effect to the user of the HVAC control-panel 100. For example, each of the manipulanda 104, 108, 112 shown may comprise a non-volatile memory comprising a plurality of selectable haptic effect profiles, wherein each haptic effect profile may comprise its own set of effect parameters from which a processor device can identify one or more effect parameters associated with a received sensor signal. Each of the manipulanda may further comprise a selector switch configured to allow selection of a haptic effect profile associated with the activity the particular control knob will be performing in the HVAC control panel 100. In one such embodiment, when the HVAC control panel 100 is assembled, the assembler may switch the selector switch for each manipulandum to the appropriate setting prior to inserting the HVAC control panel 100 into a vehicle dashboard.

For example, a haptic effect profile associated with the temperature control knob 104 may comprise a set of effect parameters from which a processor device can identify effect parameters that are configured to output a resistance to the turning of the temperature control knob 104 that is least when the temperature control knob 104 is midway between the extreme temperature settings 120 "COLD" and "HOT." The resistance a user encounters when turning the temperature control knob 104 may increase as the user turns the temperature control knob 104 toward either of the two extreme temperature settings 120 "COLD" or "HOT."

The haptic effect profile associated with the temperature control knob 104 may further comprise effect parameters from which a processor device can generate an output signal configured to output a "stop" haptic effect to the user of the HVAC control-panel 100 when the indicator 116a points to the "HOT" temperature setting 120 and the user attempts to turn the temperature control knob 104 clockwise. Similarly, the haptic effect profile associated with the temperature control knob 104 may further comprise effect parameters from which a processor device can generate an output signal configured to output a "stop" haptic effect to the temperature control knob 104 when the indicator 116a points to the "COLD" temperature setting 120 and the user attempts to turn the temperature control knob 104 counter-clockwise.

The fan speed control knob 108 shown in FIG. 1, while comprising substantially the same physical structure as the temperature control knob 104, may be configured to output a different set of haptic effects. In one embodiment, the fan speed control knob 108 may comprise the same set of three selectable haptic effect profiles as the temperature control knob 104 and the location control knob 112. In such an embodiment, a manufacturer of the HVAC control panel 100 may have previously selected the one haptic effect profile of the three that is associated with the fan speed control knob 108.

The haptic effect profile associated with the fan speed control knob 108 may comprise a plurality of effect parameters from which a processor device can identify those related to a particular sensor signal, and may generate an output signal based, at least in part, on identified effect parameters. For example, one of these output signals may be configured to provide a "stop" effect to the user of the HVAC control panel 100 if the indicator 116b is pointed at the "I" fan speed setting 124, and the user attempts to turn the fan speed control knob 108 counter clockwise. Another of the output signals may be configured to provide a detent effect each time the user turns the fan speed control knob 108 to a location where the indicator 116b points at one of the three fan speed settings 124.

The selector associated with the location control knob 112 in such an embodiment may also have been switched to select the haptic effect profile in the location control knob's 112 non-volatile memory that is associated with controlling the location of the warmed or cooled forced air. The haptic effect profile associated with the location control knob 112 may comprise, for example, effect parameters from which a processor device may generate output signals configured to provide a detent effect when the indicator 116c points to one of the five location settings 128. In one embodiment, the haptic effect profile associated with the location control knob 112 may comprise effect parameters from which a processor device can generate output signals configured to provide an assist effect that assists the user in turning the location control knob 112 to the next location setting 128 by adding a rotational force in the direction the user is turning the location control knob 112 until the indicator 116c points to the next location setting 128.

Figure 2:
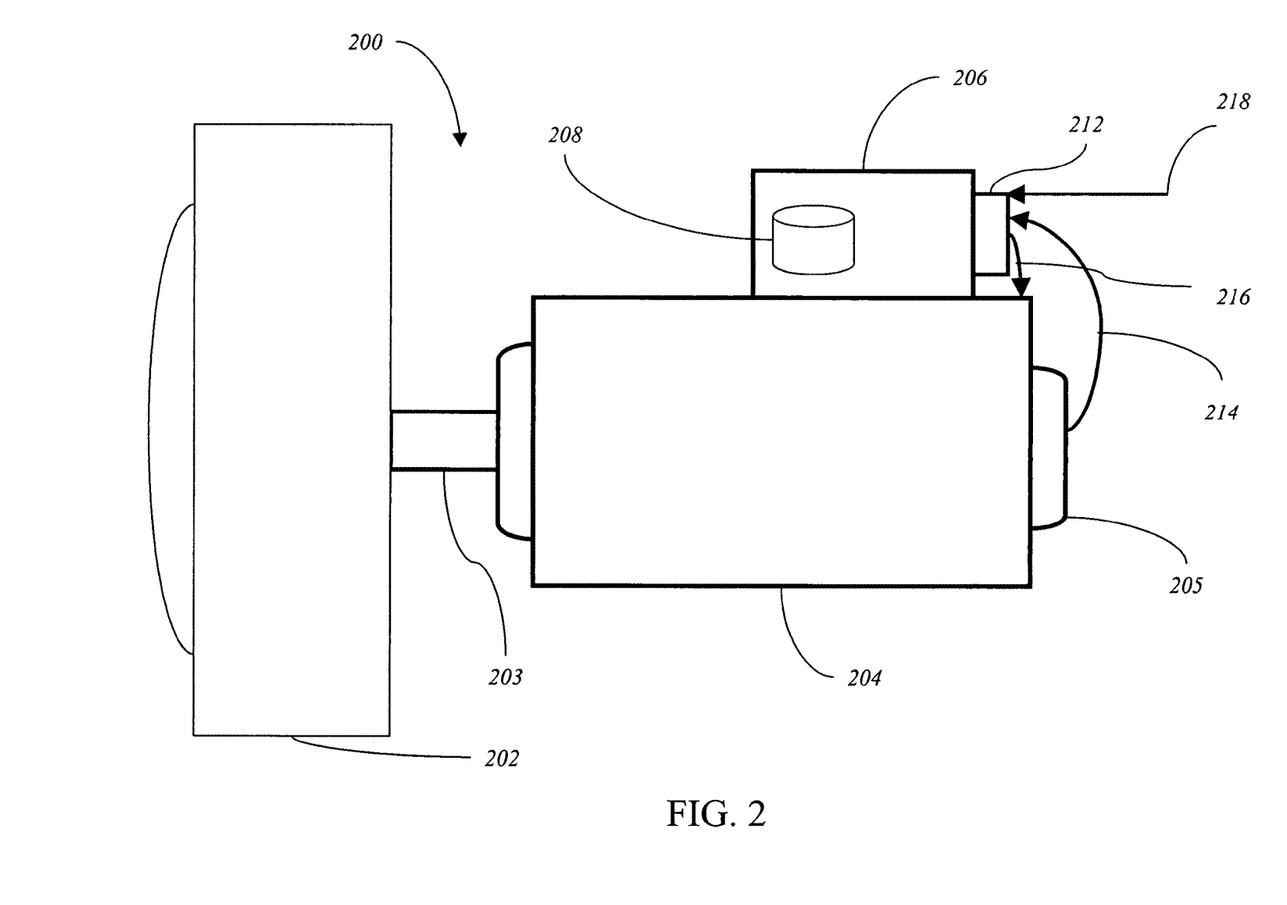
FIG. 2 is an elevation view of a control knob haptic device according to one embodiment of the present invention.

FIG. 2 shows an elevation view of a control knob haptic device 200. The control knob haptic device 200 comprises a substantially similar physical structure as the control knobs (104, 108, 112) described with relation to FIG. 1. The control knob haptic device 200 shown comprises a manipulandum, a resistive haptic actuator 204, a sensor device 205, a processor 206, and a memory 208 in one embodiment of the present invention. The manipulandum shown comprises a control knob 202. In other embodiments, the manipulandum may comprise, for example, a slider, a switch, a scroll wheel, a trackball, or a joystick. The control knob 202 may comprise, for example, the location control knob (112) shown in the HVAC control-panel (100) of FIG. 1.

At its center, the control knob 202 is connected to a shaft 203. The control knob 202 and shaft 203 rotate around a common axis. The actuator 204 shown comprises a DC motor. In other embodiments, the actuator 204 may comprise a resistive actuator, such as an electromagnetic, magnetic particle, magnetorheologic, electrorheologic, or magnetic brake. In yet other embodiments, a device according to the present invention may employ both one or more active actuators (such as a motor) and one or more resistive actuators (such as a brake). The DC motor actuator 204 shown comprises a rotor and a stator (both not shown). The rotor is in direct communication with the shaft 203. In other embodiments, the actuator 204 may further comprise a clutch between the rotor and the shaft 203.

An actuator 204 according to the present invention may comprise other, non-rotary forms. For instance, in one embodiment, a slider control may comprise a haptic device, such as an electromagnetic brake to provide resistive haptic effects to a user. The actuator 204 shown comprises a sensor device 205. The sensor device 205 is configured to detect a movement of the control knob 202 manipulandum, and to generate a sensor signal 214.

The actuator 204 shown in FIG. 2 is not free to rotate (although in other embodiments it may rotate). The actuator 204 shown is not free to move in the axial direction of the shaft 203. In other embodiments, the actuator 204 may be free to move in the axial direction of the shaft 203. For instance, the actuator 204 may be incorporated in a control knob that may be pushed in addition to rotated, such as a volume/power knob commonly found on a control-panel of an automobile stereo.

The shaft 203 shown is constrained from moving in its axial direction, but is free to rotate as the user manipulates the control knob 202 manipulandum unless the actuator 204 resists the rotation of the control knob 202 in response to receiving an output signal 216 from the processor 206. In other embodiments, the shaft 203 may be free to move in its axial direction. In one such embodiment, the actuator 204 resists the movement of the shaft 203 in the axial direction when actuated.

When the actuator 204 shown receives the output signal 216 in the form of an electrical current, it applies a force on the rotor. The force on the rotor may cause a resistance to the rotation of the shaft 203 in communication with the rotor, and the control knob 202 in communication with the shaft 203. The resistance to the rotation of the control knob 202 may cause the control knob 202 to stop or may exert a force the user can overcome. When the actuator 204 receives an output signal 216 in the form of a pulsed electrical current, a haptic effect in the form of a vibration may be created.

The control knob haptic device 200 shown in FIG. 2 further comprises a processor 206. The processor 206 is in communication with an I/O port 212. The actuator 204 is also in communication with the I/O port 212. The processor 206 may receive the sensor signal 214 from the sensor device 205 via the I/O port 212. The processor 206 may identify one or more effect parameters associated with the sensor signal 214 in the locally-stored haptic effect profile in the memory 208. The processor 206 may then generate an output signal 216 based, at least in part, on the identified effect parameters. The output signal 216 may be configured to cause the actuator 204 to output a haptic effect associated with the identified effect parameters to the control knob 202 manipulandum.

In the embodiment shown, the output signal 216 comprises an electrical current. The electrical current of the output signal 216 shown is supplied through the I/O port 212 by a power supply (not shown) as indicated by the arrow 218. The processor 206 may control the actuator via the output signal 216 comprising the electrical current generated by the power supply. Processors may comprise, for example, digital logical processors capable of processing input, executing algorithms, and generating output as necessary to create the desired tactile sensations in the control knob haptic device 200 in response to the sensor signal 214 received from the sensor device 205. Such processors may comprise a microprocessor, an Application Specific Integrated Circuit (ASIC), and a state machine.

The processor 206 shown comprises the memory 208. The memory 208 shown comprises a non-volatile memory. In other embodiments, the memory 208 may comprise a volatile memory, and/or may comprise a data storage device external to the processor 206. The memory 208 shown comprises the haptic effect profile. In other embodiments the memory 208 may comprise a selectable plurality of haptic effect profiles. The haptic effect profile may comprise one or more effect parameters associated with the sensor signal 214 output by the sensor device 205 in communication with the control knob 202 manipulandum. In one embodiment, the haptic effect profile may comprise a plurality of effect parameters from which the processor 206 may generate an output signal or signals. The memory 208 shown may further comprise instructions configured to inform the processor 206 which effect parameter or parameters are associated with the sensor signal within the haptic effect profile.

The memory 208 shown may comprise, for example, an electrically-erasable programmable read-only memory (EEPROM), such as the type commonly used in laptop computers to store data when the computer is placed in a hibernation mode. The haptic effect profile in the embodiment shown may be downloaded to the memory 208 by flashing it onto an EEPROM using a signal comprising a voltage commonly used to program, erase, and reprogram memory devices in a personal computer. The haptic effect profile comprising the effect parameters may be downloaded to the memory 208 at different times in different embodiments. For instance, the haptic effect profile may be flashed onto the memory 208 during manufacture of the control knob haptic device 200, during installation of the control knob haptic device 200, or any other time when the memory 208 is in communication with a device capable of downloading the haptic effect profile, such as a programmable bus.

An effect parameter may be configured to define a characteristic, such as a magnitude, a duty cycle, a period, a waveform, or a duration, of a haptic effect based, at least in part, on the effect parameter. The processor 206 may identify the effect parameter(s) associated with the sensor signal in the haptic effect profile on the memory 208. In an alternative embodiment, a haptic device according to the present invention may comprise an external memory 208 in communication with the processor 206.

In another embodiment, the processor 206 may be in communication with media, for example computer-readable media, which stores instructions that, when executed by the processor 206, may cause the processor 206 to perform the steps described herein. Embodiments of computer-readable media include, but are not limited to, an electronic, optical, magnetic, or other storage or transmission device capable of providing a processor, such as the processor in a web server, with computer-readable instructions. Other examples of media include, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other forms of computer-readable media may transmit or carry instructions to a computer, including a router, private or public network, or other transmission device or channel. The processor 206, and the processing, described may be in one or more structures, and may be dispersed through one or more structures. The processor may comprise code for carrying out one or more of the methods (or parts of methods) described herein.

The processor 206 in the embodiment shown may be capable of generating a variety of output signals 216, each configured to cause the actuator 204 to output a distinct haptic effect associated with one ore more different effect parameters identified by the processor 206. For example, the processor 206 may create effects, such as detents, between or at the location settings (128) found around the circumference of the location control knob (112) described with reference to FIG. 1. The processor 206 may create additional effects as well, including, for example, bumps, vibrations and stops by applying output signals 216 comprising various currents to the actuator 204 shown in FIG. 2.

The I/O port 212 shown in FIG. 2 is in communication with the actuator 204, the sensor device 205, the processor 206, and the power supply (not shown). The sensor device 205 may communicate to the processor 206 the sensor signal 214 relating the position of the control knob 202 through the I/O port 212. The processor 206 may communicate to the actuator 204 through the I/O port 212 the output signal 216 comprising the electrical current, configured to cause the DC motor actuator 204 shown to act upon the rotor, providing the haptic effect associated with the identified effect parameters to the user of the control knob haptic device 200.

The I/O port 212 shown is in communication with a power supply (as indicated by an arrow 218). The power supply in one embodiment may comprise a power storage device, such as a battery. In such an embodiment, the I/O port 212 may be in communication with the power storage device. In yet other embodiments, the processor 206 may be in direct communication with a power storage device or another type of power supply. In one embodiment, the control knob haptic device 200 may comprise the power storage device, such as a battery capable of supplying the power necessary to cause the actuator 204 to output the haptic effect. In such an embodiment, the power storage device may be in communication with the processor 206 either directly or indirectly through the I/O port 212.

Figure 3:
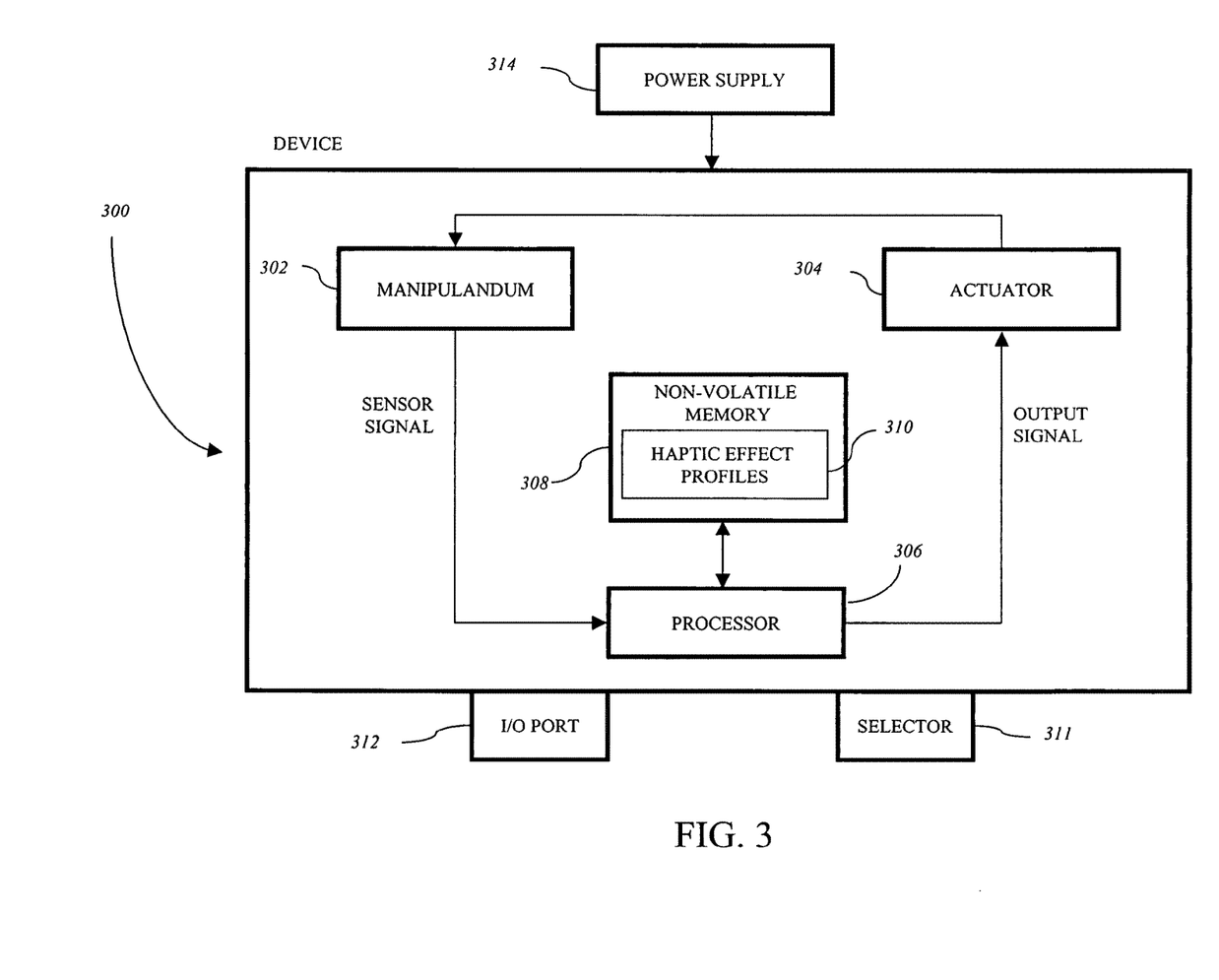
FIG. 3 is a block diagram, illustrating one embodiment of a haptic device according to the present invention.

FIG. 3 is a block diagram, illustrating one embodiment of a device 300 according to the present invention. The device 300 shown may comprise, for instance, the control knob haptic device 200 described in relation to FIG. 2. In the embodiment shown, the device 300 includes a manipulandum 302. The manipulandum 302 may comprise one of the control knob manipulanda discussed in relation to FIGS. 1-2 or various other types of manipulanda (such as a roller, a trackball, a scroll wheel, a slider, a switch, etc.).

The device 300 shown further comprises an actuator 304, such as a DC motor. The DC motor may comprise a device similar to the one discussed in relation to FIG. 2 or another device. The manipulandum 302 and actuator 304 are in communication with a processor 306. The processor 306 in the embodiment shown in FIG. 3 may be similar to the processor discussed in relation to FIG. 2. The processor 306 may receive sensor signals from a position sensor in communication with the manipulandum 302. The processor 306 may also perform control algorithms, identify effect parameters, generate output signals, and send the generated output signals as feedback control signals to the actuator 304.

The device 300 shown further comprises a non-volatile memory 308 (such as an EEPROM). In other embodiments, the memory 308 may comprise a volatile memory. The memory 308 comprises a selectable plurality of haptic effect profiles 310. The haptic effect profiles 310 shown each may comprise a plurality of effect parameters. The processor 306 is in communication with the memory 308. The memory 308 may comprise any suitable data storage device of a physical size appropriate to fit within the device 300, and comprising a capacity sufficient to store the haptic effect profiles 310. In another embodiment, the memory 308 may comprise a data storage device located outside of the device 300, and may be in communication with the device 300.

The processor 306 shown is in communication with the memory 308. The processor 306 may identify at least one effect parameter associated with the sensor signal in the haptic effect profiles 310. The processor 306 may then generate an output signal based, at least in part, on the identified effect parameters. The output signal may be configured to cause the actuator 304 to output a haptic effect associated with the effect parameter or parameters to the manipulandum 302. The processor 306 may output the generated output signal to the actuator 304. In other embodiments, the device 300, or a plurality of related haptic devices 300, may incorporate a plurality of actuators 304. In one such embodiment, the processor 306 may output the output signal to the plurality of actuators 304. In another such embodiment, each of the plurality of actuators 304 may be associated with a distinct haptic effect profile contained in the selectable plurality of haptic effect profiles 310. The processor 306 in such an embodiment may output a distinct output signal to each of the plurality of actuators 304. In the embodiment shown, the outputting of the output signal based, at least in part, on the identified effect parameters may be accomplished by sending an electrical current to the DC motor actuator 304.

The device 300 further comprises a selector 311. In one embodiment, the selector 311 shown may comprise, for example, a jumper configured provide an electrical connection between two points on a circuit board comprising a plurality of different combinations of points, wherein each different combination of two points on the circuit board may be associated with a distinct haptic effect profile 310 stored in the memory 308. In another embodiment, the selector may comprise a different form (such as a switch). The processor 306 may be in communication with the selector 311. The selector 311 may be configured select at least one desired haptic effect profile from the selectable plurality of haptic effect profiles 310. In other embodiments, the selectable plurality of haptic effect profiles 310 may comprise a single haptic effect profile, and the device 300 may not comprise a selector 311. In one embodiment, the selector 311 may also be configured to turn the device 300 on and off, and/or to enable or disable a haptic effect profile stored in the memory 308. In another embodiment, a haptic effect profile may be automatically or manually selected from a selectable plurality of haptic effect profiles 310 by using one or more digital input pins.

An output signal output by the processor 306 may comprise an electrical current, and may be generated with power supplied by a power supply 314. The power supply 314 may comprise a power storage device, such as a battery. For example, in one embodiment, the power supply 314 may comprise a 12-Volt lead-acid battery as may be commonly found in an automobile. In one embodiment, the device 300 may comprise the power storage device. For example, in one such embodiment, the device 300 may comprise an "n"-size lithium-ion battery power supply 314 in communication with the processor 306. Upon receiving the output signal based, at least in part, on the identified effect parameter or parameters, the actuator 304 may provide to the manipulandum 302 the haptic effect (or at least one of a plurality of haptic effects) associated with the identified effect parameters or parameters contained in the selectable haptic effect profile selected by the selector 311 from the selectable plurality of haptic effect profiles 310.

The device 300 further comprises an input means, and/or an output means. For example, in the embodiment shown, the device 300 comprises an input/output (I/O) port 312 for performing unidirectional or bi-directional communication with external devices utilizing an embodiment of the present invention. The I/O port 312 may comprise, for example, a game port or a universal serial bus (USB) port. For instance, in one embodiment, the device 300 may be configured to download the selectable plurality of haptic effect profiles 310 from a programmable bus in communication with the I/O port 312 to the memory 308. In one such embodiment, the selectable plurality of haptic effect profiles 310 may be modified or erased via communication through the input/output port 312 with a programmable bus.

In the embodiment shown, the device 300 receives power from an external power supply 314 via the I/O port 312. In other embodiments, power may be supplied to the device 300 via alternative methods. For instance, power may be supplied directly to the processor, or by utilizing an internal power supply or a power storage device, such as a battery, incorporated into the device 300 as described above. Various embodiments may utilize additional components as well, such as an amplifier to amplify signals to the actuator.

Various methods and devices utilizing the present invention may be employed. For instance, one method according to the present invention comprises receiving a sensor signal from a sensor in communication with a manipulandum, identifying an effect parameter associated with the sensor signal in a locally-stored haptic effect profile, and generating an output signal based, at least in part, on the effect parameter. The sensor may sense a movement of the manipulandum in communication therewith, and the sensor signal may indicate such a movement.

In one embodiment, a processor in communication with the sensor and the actuator may carry out such a method. For example, the processor may identify one or more effect parameters in the locally-stored haptic effect profile and generating an output signal by receiving, gathering, incorporating, sorting, or combining the one or more identified effect parameters. In one embodiment, such a processor may generate the output signal without communicating with any other processor device (such as a host processor). A generated output signal may be configured to cause an actuator to output a haptic effect associated with the effect parameter. For example, in one embodiment, the actuator may output the haptic effect to the manipulandum in communication with the sensor. In another embodiment, the actuator may output the haptic effect to an element other than the manipulandum, such as a device housing.

In one embodiment, the locally-stored haptic effect profile may comprise a plurality of selectable haptic effect profiles. A method according to the invention may further comprise selecting, either permanently or otherwise, at least one haptic effect profile from the selectable plurality of haptic effect profiles in the locally-stored haptic effect profile.

The actuator in one embodiment may comprise a plurality of actuators, and the output signal may be configured to cause the plurality of actuators to output the haptic effect associated with the effect parameter, for example to a single manipulandum or a corresponding plurality of manipulanda. One method according to the present invention may further comprise determining a state. For instance, a processor, such as the example processor (206) of FIG. 2, may determine from the sensor signal (214) whether the control knob (202) manipulandum has been turned to its furthest extremity, indicating a state in which the control knob (202) manipulandum may only be turned one direction. In one such embodiment, the effect parameter may be identified in relation to the determined state. In another such embodiment, the output signal may be generated in relation to the determined state. In one embodiment, the processor (206) may generate an output signal based, at least in part, on an effect parameter or parameters in the haptic effect profile or profiles.

The locally-stored haptic effect profile may comprise a haptic effect profile or selectable plurality thereof stored in a non-volatile memory. Methods embodying the present invention may further comprise erasing the locally-stored haptic effect profile(s). Similarly, some embodiments may further comprise modifying the locally-stored haptic effect profile(s). For instance, one method further comprises receiving the locally-stored haptic effect profile(s) from a programmable bus. A device may be in temporary communication with the programmable bus long enough to download the desired haptic effect profile or profiles. The programmable bus may electrically connect the processor device with various components of a computer by forming paths along which electrical signals comprising data may travel. In one embodiment, a downloaded haptic effect profile may be stored in a memory (such as a non-volatile memory).

An effect parameter or plurality thereof in the locally-stored haptic effect profile(s) may also be modifiable in some embodiments. For instance, an effect parameter(s) may be erasable and modifiable. One embodiment further comprises receiving the effect parameter(s) from a programmable bus. Another such method further comprises storing the effect parameter(s) in the locally-stored haptic effect profile(s).

The present invention may also be embodied in a device. One such device comprises an actuator, a non-volatile memory configured to store a haptic effect profile, and a processor in communication with the non-volatile memory and the actuator. The non-volatile memory may comprise one or more haptic effect profiles in one embodiment. In such an embodiment, a stored haptic effect profile may comprise one or more effect parameters. The actuator may comprise a plurality of actuators, and the processor may be in communication with the plurality of actuators.

The processor may be configured to receive a sensor signal indicating a movement of a manipulandum. In one embodiment, a device according to the present invention may further comprise a sensor in communication with the processor and one or both of the manipulandum and the actuator. The sensor in such an embodiment may be configured to generate the sensor signal received by the processor. The processor may further be configured to identify at least one effect parameter associated with the sensor signal in the haptic effect profile. The processor may also be configured to generate an output signal based, at least in part, on the identified effect parameter. The processor-generated output signal may be configured to cause the actuator to provide a haptic effect associated with the effect parameter. For example, in one embodiment, the haptic effect may be provided to the manipulandum the sensor signal indicated a movement of.

A device according to the present invention may further comprise a power supply in communication with the processor. The power supply may be in communication with the actuator, and configured to supply power required to generate the output signal. In one embodiment comprising a power supply, the power supply may comprise a power storage device, such as a battery.

The haptic effect profile may comprise a selectable plurality of haptic effect profiles, each comprising one ore more effect parameters. A device according to the present invention may further comprise a selector configured to allow selection of at least one desired haptic effect profile from the selectable plurality of haptic effect profiles in the non-volatile memory. In one such embodiment, the selector may be configured to allow a permanent selection of at least one haptic effect profile from the selectable plurality of haptic effect profiles. The selector may comprise, for example, a switch, a jumper, or any other suitable means for selecting at least one haptic effect profile from the selectable plurality of haptic effect profiles in the non-volatile memory.

For example, in one embodiment, a device according the present invention may comprise a bi-polar switch in communication with the processor. In one such embodiment, the bi-polar switch may be configured, for example, to allow a manufacturer, installer, or user to select between two haptic effect profiles in the non-volatile memory based on the intended use of the device and/or on a user preference. In another embodiment, the selector may comprise a piece of solder that has been soldered between two electrical contact points on a circuit board such that a haptic effect profile has been selected from the selectable plurality thereof in the non-volatile memory.

The non-volatile memory may comprise, in one embodiment, an EEPROM. In one embodiment, the non-volatile memory may be configured to download the haptic effect profile(s). In such an embodiment, the haptic effect profile(s) may comprise a downloaded haptic effect profile(s). In one such embodiment, the downloaded haptic effect profile(s) may be configured to be downloaded from a programmable bus to the non-volatile memory. Similarly, an embodiment may comprise a downloaded effect parameter or plurality thereof in the haptic effect profile(s). For instance, a downloaded effect parameter may be configured to be downloaded from a programmable bus to a locally-stored haptic effect profile.

One device according to the present invention may further comprise a modifiable haptic effect profile or selectable plurality thereof. For example, in one embodiment, an effect parameter or parameters in a haptic effect profile may be modifiable in order to permit the device to output a different haptic effect or effects. Another embodiment may comprise an erasable haptic effect profile. For example, in one embodiment, one or more effect parameters in a locally-stored haptic effect profile may be erasable or modifiable.

The present invention may alternatively be embodied in a computer-readable medium on which is encoded program code. The program code in such an embodiment may comprise program code for receiving a sensor signal from a sensor in communication with a manipulandum. For example, the sensor signal may comprise an indication of a movement of the manipulandum. The computer-readable medium may further comprise program code for identifying at least one effect parameter associated with the sensor signal in a locally-stored haptic effect profile, and program code for generating an output signal based, at least in part, on the effect parameter. The output signal may be configured to cause an actuator to output a haptic effect associated with the effect parameter. For example, in one embodiment, the haptic effect may be output to the manipulandum that the sensor signal indicated a movement of. In another embodiment, the haptic effect may be output to another element of a device, such as a housing.

One such computer-readable medium embodiment may further comprise program code for selecting the haptic effect profile from a selectable plurality of haptic effect profiles contained in a non-volatile memory. A computer-readable medium embodiment may further comprise program code for a multitude of different functions. For instance, an embodiment may comprise program code for modifying the locally-stored haptic effect profile. Another embodiment may comprise program code for erasing the locally-stored haptic effect profile.

The locally-stored haptic effect profile may be downloaded. One such embodiment may further comprise program code for receiving the locally-stored haptic effect profile from a programmable bus. Another such embodiment may further comprise program code for storing the locally-stored haptic effect profile in a memory, such as the non-volatile memory. Similarly, the one or more effect parameters in the locally-stored haptic effect profile may be downloaded. In one such embodiment, the computer-readable medium may comprise program code for receiving an effect parameter from a programmable bus. Another such embodiment may comprise program code for storing an effect parameter in the locally-stored haptic effect profile. Another embodiment may comprise program code for determining a state.

Figure 4:
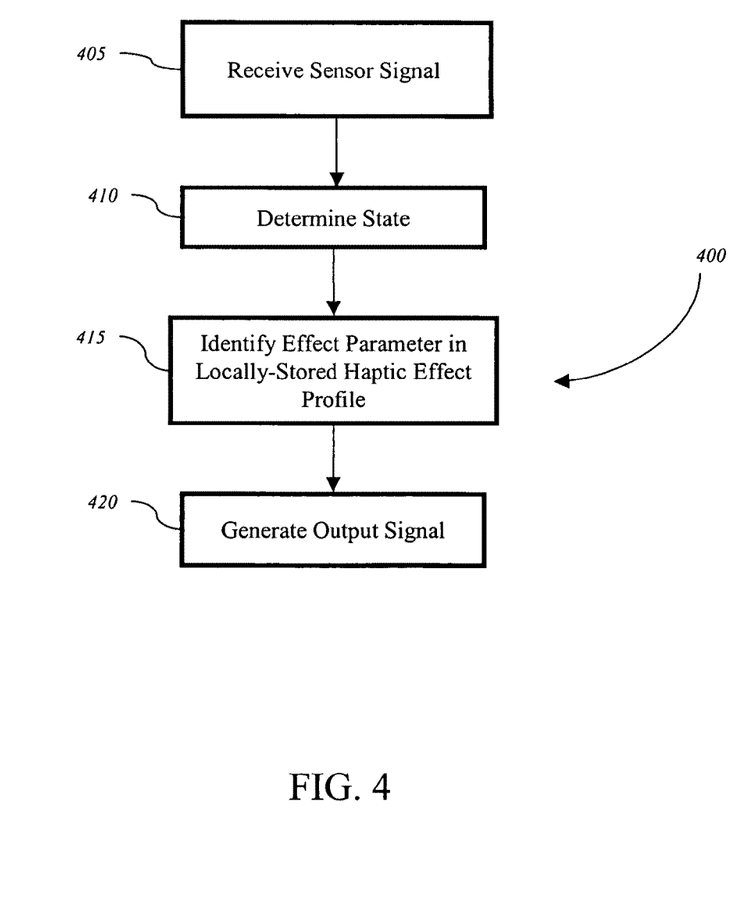
FIG. 4 is a flowchart, illustrating a method for providing haptic effects according to one embodiment of the present invention.

Referring again to the Figures, FIG. 4 is a flowchart illustrating a method for providing haptic effects according to one embodiment of the present invention. The method shown in illustrated in FIG. 4 is described with reference to HVAC control-panel (100) shown in FIG. 1. A user of the HVAC control-panel (100) may be in the process of changing the escape location of warmed or cooled forced air into an automobile comprising the HVAC control-panel (100) utilizing an embodiment of the present invention. The HVAC control-panel (100) may include a location control knob (112). For example, the location control knob (112) may be the manipulandum of FIG. 2. The user of the HVAC control-panel (100) may determine that the automobile cabin temperature near a floor of the automobile is too cool. The user may then utilize an interface device, such as the location control knob (112), to change the output location of forced warmed air to a location setting (128) that will permit the forced air to escape near the floor of the automobile. For instance, the user may turn the location control knob (112) to the "FEET" location setting (128).

As shown in box 405 of FIG. 4, when the user turns the location control knob (112) manipulandum, a processor may receive a sensor signal from a sensor in communication with the location control knob (112) manipulandum. As shown in box 410, in the embodiment shown, the processor may determine a state. For instance, the processor may determine whether the location control knob (112) is beginning its rotational movement from a position corresponding to a location setting (128), or from a position not corresponding to a location setting (128). As shown in box 415, the processor may then identify at least one effect parameter associated with the sensor signal in a locally-stored haptic effect profile. The identified effect parameter or parameters, as in the embodiment shown, may further be associated with the state determination made by the processor.

The processor may be in communication with an actuator. As shown in box 420, the processor may generate an output signal based, at least in part, on the identified effect parameter. The output signal may be configured to cause the actuator in communication with the control knob (112) manipulandum to output a haptic effect associated with the effect parameter on the control knob (112). For instance, the actuator may comprise a DC motor in direct communication with the location control knob (112). In such an embodiment, the output signal may comprise an electrical current. The electrical current may be configured to cause the DC motor actuator in communication with the location control knob (112) to create a detent haptic effect associated with the identified effect parameter between the location settings (128). The detent effect may be caused by a DC motor actuator creating a resistance on the location control knob (112) over a short interval of time in response to receiving the electrical current. The user can overcome the detent haptic effect by continuing to turn the location control knob (112) to a desired location setting (128). The detent haptic effect may provide an indication to the user that he or she is between location settings (128), and that the location control knob (112) must be turned further to select a location setting (128).

The method shown in FIG. 4 may also be used to provide a stop effect to the user. If the user attempts to turn the location control knob (112) too far, for instance, clockwise past the "DEFROST" location setting (128), the processor device may receive a sensor signal from the sensor in communication with the location control knob (112) and determine that the user has inadvertently attempted to turn the location control knob (112) the wrong way. The processor may then identify in the locally-stored haptic effect profile one or more effect parameters associated with the sensor signal that indicates a state where the user has attempted to turn the control knob (112) the wrong way.

The processor may then generate an output signal based, at least in part, on the identified effect parameters. For example, the processor may generate an output signal comprising aspects of a plurality of identified effect parameters, such as a period and amplitude of a sine wave output signal, as well as the duration of the output signal. The output signal may be configured to cause the actuator to output a "stop" haptic effect associated with the identified effect parameters on the control knob (112). The generated output signal may then be transmitted to the actuator, causing a strong resistance to the further rotation of the location control knob (112) in the wrong direction that may not be overcome. Various other types of effects may be utilized. For example, in one embodiment, the actuator may provide a "bump" haptic effect when the location control knob (112) is rotated to a location setting (128).

Embodiments of the present invention may be incorporated into a broad array of devices. For example, an instrument control interface in an automobile may utilize rotary control knobs comprising DC motor haptic actuators according to the present invention. A television remote control may also incorporate an embodiment of the present invention for channel navigation, volume control, and other related functions. Similarly, an audio component remote control may utilize an embodiment for volume control or other audio control. A laptop computer may utilize an embodiment for navigation, volume control, or any other function utilizing a control knob, scroll wheel, scroll drum, linear slider, or similar user interface device. Home or automobile HVAC control-panels, handheld navigation devices, and handheld email appliances may also benefit from utilizing an embodiment of the present invention.

The foregoing description of the embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A system comprising:
   a plurality of control knob assemblies associated with a vehicle's heat/ventilation/air-conditioning ("HVAC") system, each control knob assembly comprising:
   a control knob movable in a degree of freedom to control an HVAC function;
   an actuator configured to output a haptic effect to the control knob; and
   a non-volatile memory comprising a plurality of selectable haptic effect profiles, each haptic profile of the plurality of selectable haptic effect profiles comprising:
   a plurality of haptic parameters describing a plurality of haptic effects, each haptic effect of the plurality of haptic effects associated with a position of the control knob within the degree of freedom,
   a plurality of sensor parameters associated with the plurality of haptic effects, the plurality of sensor parameters associated with the positions of the control knob within the degree of freedom; and a processor in communication with the plurality of control knob assemblies, the processor configured to, for each control knob assembly:
  determine a selected haptic effect profile of the plurality of selectable haptic effect profiles for the respective control knob assembly;
  receive a sensor signal indicating a position of the control knob of the respective control knob assembly;
  identify a haptic effect in the selected haptic effect profile based at least in part on (i) the sensed position of the control knob, and (ii) a sensor parameter of the plurality of sensor parameters of the selected haptic effect profile associated with the sensed position of the control knob and the respective haptic parameters associated with a haptic effect; and
  output an actuator signal configured to cause the actuator of the respective control knob assembly to output the haptic effect.

2. The system of claim 1, wherein the degree of freedom is one of a rotational degree of freedom or an axial degree of freedom.

3. The system of claim 2, wherein the control knob is movable in two degrees of freedom, the two degrees of freedom comprising a rotational degree of freedom and an axial degree of freedom, and further comprising a second actuator, the actuator configured to output the haptic effect in the rotational degree of freedom and the second actuator configured to output a second haptic effect in the axial degree of freedom.

4. The system of claim 1, wherein the actuator comprises a direct-current rotary motor.

5. The system of claim 1, wherein the HVAC function comprises one of a fan speed, a temperature, or a location.

6. The system of claim 1, wherein the non-volatile memory is configured to receive a download of one or more haptic effect profiles.

7. The system of claim 1, wherein at least one of the control knob assemblies comprises a downloaded haptic effect profile.

8. The system of claim 7, wherein at least one of the control knob assemblies is configured to download the downloaded haptic effect profile from a programmable bus.

9. A system comprising:
  a plurality of control knob assemblies associated with a vehicle's stereo system, each control knob assembly comprising:
    a control knob movable in a degree of freedom to control a stereo function;
    an actuator configured to output a haptic effect to the control knob; and
    a non-volatile memory comprising a plurality of selectable haptic effect profiles, each haptic profile of the plurality of selectable haptic effect profiles comprising:
      a plurality of haptic parameters describing a plurality of haptic effects, the plurality of haptic effects associated with positions of the control knob within the degree of freedom,
      a plurality of sensor parameters associated with the plurality of haptic effects, the plurality of sensor parameters associated with the positions of the control knob within the degree of freedom; and
  a processor in communication with the plurality of control knob assemblies, the processor configured to, for each control knob assembly:
    determine a selected haptic effect profile of the plurality of selectable haptic effect profiles for the respective control knob assembly;
    receive a sensor signal indicating a position of the control knob of the respective control knob assembly;
    identify a haptic effect in the selected haptic effect profile based at
    least in part on (i) the sensed position of the control knob, and (ii) a sensor parameter of the plurality of sensor parameters of the selected haptic effect profile associated with the sensed position of the control knob and the respective haptic parameters associated with a haptic effect; and
    output an actuator signal configured to cause the actuator of the respective control knob assembly to output the haptic effect.

10. The system of claim 9, wherein the degree of freedom is one of a rotational degree of freedom or an axial degree of freedom.

11. The system of claim 10, wherein the control knob is movable in two degrees of freedom, the two degrees of freedom comprising a rotational degree of freedom and an axial degree of freedom, and further comprising a second actuator, the actuator configured to output the haptic effect in the rotational degree of freedom and the second actuator configured to output a second haptic effect in the axial degree of freedom.

12. The system of claim 9, wherein the actuator comprises a direct-current rotary motor.

13. The system of claim 9, wherein the stereo function comprises one of a volume, a radio frequency, a balance, a fader, a bass level, or a treble level.

14. The system of claim 9, wherein the non-volatile memory is configured to receive a download of one or more haptic effect profiles.

15. The system of claim 9, wherein at least one of the control knob assemblies comprises a downloaded haptic effect profile.

16. The system of claim 15, wherein at least one of the control knob assemblies is configured to download the downloaded haptic effect profile from a programmable bus.

17. A method comprising:
  determining a selected haptic effect profile of a plurality of selectable haptic effect profiles for a respective control knob assembly of a plurality of control knob assemblies, each control knob assembly associated with a vehicle's heat/ventilation/air-conditioning ("HVAC") system or a vehicle's stereo system, each control knob assembly comprising:
    a control knob movable in a degree of freedom to control a stereo function or an HVAC function;
    an actuator configured to output a haptic effect to the control knob; and
    a non-volatile memory comprising the plurality of selectable haptic effect profiles for the respective control knob assembly, each haptic profile of the plurality of selectable haptic effect profiles comprising:
      a plurality of haptic parameters describing a plurality of haptic effects, the plurality of haptic effects associated with positions of the control knob within the degree of freedom,
      a plurality of sensor parameters associated with the plurality of haptic effects, the plurality of sensor parameters associated with the positions of the control knob within the degree of freedom; and receiving a sensor signal indicating a position of the control knob of the respective control knob assembly;

identifying a haptic effect in the selected haptic effect profile based at least in part on (i) the sensed position of the control knob, and (ii) a sensor parameter of the plurality of sensor parameters of the selected haptic effect profile associated with the sensed position of the control knob and the respective haptic parameters associated with a haptic effect; and outputting an actuator signal configured to cause the actuator of the respective control knob assembly to output the haptic effect.

18. The method of claim 17, wherein the degree of freedom is one of a rotational degree of freedom or an axial degree of freedom.

19. The method of claim 18, wherein the control knob is movable in two degrees of freedom, the two degrees of freedom comprising a rotational degree of freedom and an axial degree of freedom, and further comprising a second actuator, the actuator configured to output the haptic effect in the rotational degree of freedom and the second actuator configured to output a second haptic effect in the axial degree of freedom.

20. The method of claim 17, wherein the actuator comprises a direct-current rotary motor.

21. The method of claim 17, wherein the stereo function comprises one of a volume, a radio frequency, a balance, a fader, a bass level, or a treble level.

22. The method of claim 17, wherein the HVAC function comprises one of a fan speed, a temperature, or a location.

23. The method of claim 17, wherein the non-volatile memory is configured to receive a download of one or more haptic effect profiles.

24. The method of claim 17, wherein at least one of the control knob assemblies comprises a downloaded haptic effect profile.

25. The method of claim 24, wherein the at least one of the control knob assemblies is configured to download the downloaded haptic effect profile from a programmable bus.

* * * * *